(12) United States Patent
Olson et al.

(10) Patent No.: US 6,755,407 B1
(45) Date of Patent: Jun. 29, 2004

(54) TOOL CLAMP AND METHOD

(75) Inventors: Vincent T. Olson, Mukiltco, WA (US); Scott T. Ulinski, Arlington, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/357,678

(22) Filed: Feb. 4, 2003

(51) Int. Cl.⁷ ............................................. B23Q 1/00
(52) U.S. Cl. ..................... 269/49; 269/48.1; 411/54.1; 411/57.1
(58) Field of Search ................... 269/49, 48.1, 48.2, 269/48.3, 48.4, 47, 263; 411/54.1, 57.1, 45, 55

(56) References Cited

U.S. PATENT DOCUMENTS

| | | | | |
|---|---|---|---|---|
| 4,537,542 A | * | 8/1985 | Pratt et al. | ..................... 411/55 |
| 4,548,533 A | | 10/1985 | Pratt | |
| 4,787,274 A | * | 11/1988 | Belanger | ..................... 81/59.1 |
| 4,934,885 A | | 6/1990 | Woods et al. | |
| 4,936,726 A | * | 6/1990 | Medard | ..................... 411/44 |
| 5,228,731 A | * | 7/1993 | Glass | ..................... 292/258 |
| 5,240,361 A | * | 8/1993 | Armstrong et al. | ........ 269/48.2 |
| 5,694,690 A | | 12/1997 | Micale | |
| 6,196,779 B1 | | 3/2001 | Falk | |

* cited by examiner

*Primary Examiner*—Joseph J. Hail, III
*Assistant Examiner*—Daniel G. Shanley
(74) *Attorney, Agent, or Firm*—Harness Dickey & Pierce P.L.C.

(57) ABSTRACT

A clamp for securing a tool to a multi-piece panel assembly. The clamp is especially suited for applications where access to only one side of the panel assembly is available. The clamp uses a blind temporary fastener that is secured to the panel assembly to hold the independent panels of the assembly together. The clamp includes an sleeve member that is attached to the temporary fastener and a socket that attaches to the sleeve member and is axially adjustable therewith. The clamp attaches to the temporary fastener without modification of the temporary fastener and clamps the tool to the panel assembly. The clamp is adjustable for a variety of tool thicknesses and can be removed without removal of the temporary fastener.

18 Claims, 5 Drawing Sheets

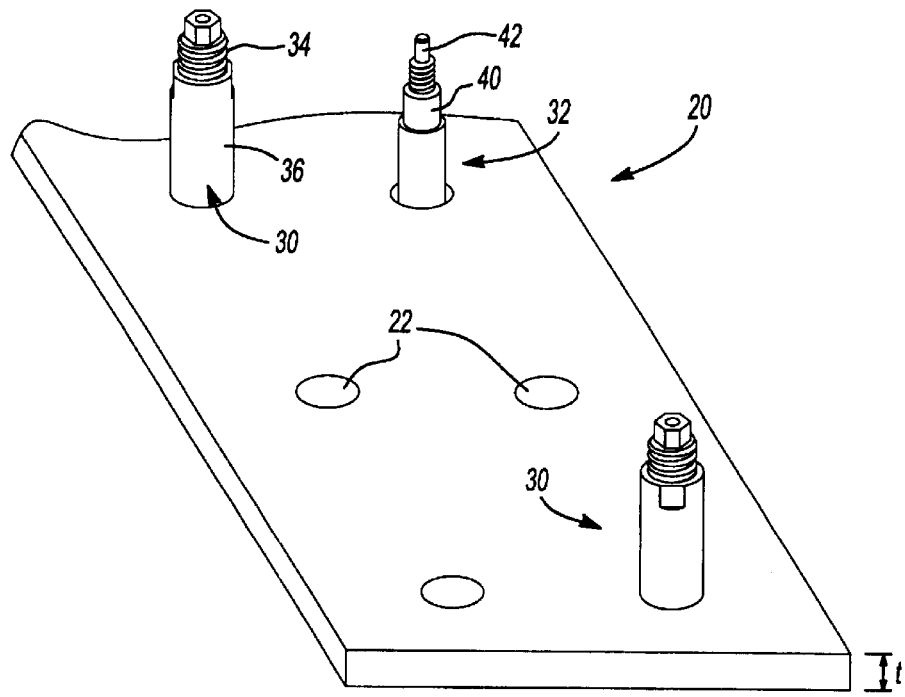
Fig-2
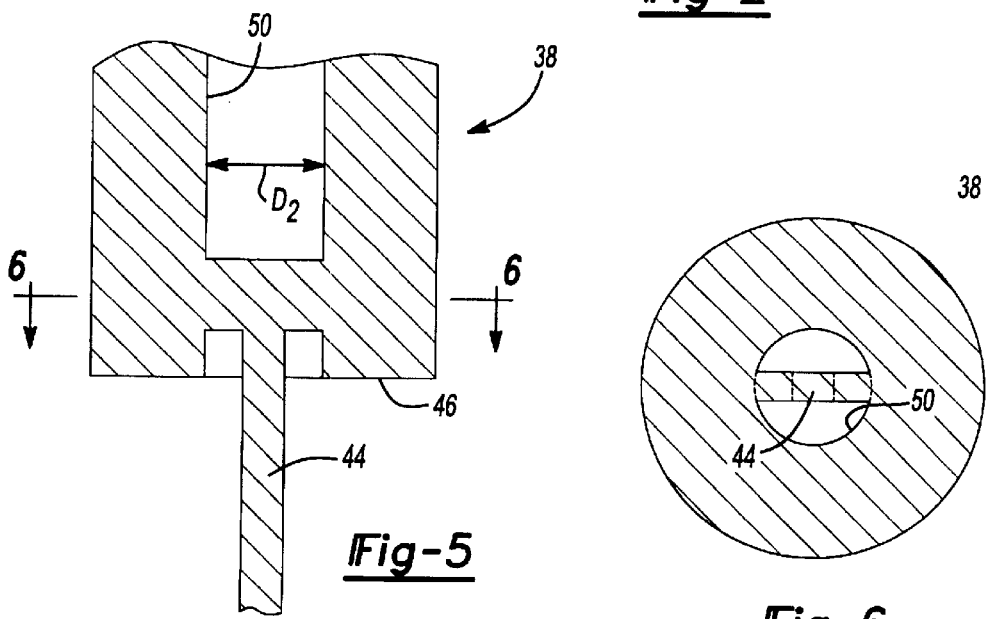
Fig-5
Fig-6

TOOL CLAMP AND METHOD

FIELD OF THE INVENTION

The present invention relates generally to a clamp used to align and secure a tool to at least one part.

BACKGROUND OF THE INVENTION

In many environments it is necessary to temporarily secure a tool, such as a jig drill template or locating jig, to one or more parts while other operations, such as drilling and/or riveting operations, are performed. For example, temporary fasteners are often used in the aircraft industry to temporarily attach jig drill templates to a multi-layer structure in order to perform a drilling operation on the multi-layer structure.

Typically, clamps or fasteners are used to align the tool to the part(s) of a multi-layer structure and to apply a clamp load to the tool and the part(s) that clamps the tool and the part(s) together. These parts can include panels and structural members. Thereafter, an operation such as drilling a plurality of holes in the part(s) or riveting the part(s) together may be performed.

Known clamps frequently require access to both sides of the part(s), which may not be practical, convenient or comfortable for the technician, as for example when the parts are components of an aircraft and located in the wings or empennage.

Thus, what is needed is a temporary tool fastener that can be attached with access to only one side of a work surface and does not require modification of the temporary fastener. Such a tool would be especially useful in the fabrication and/or assembly of aircraft components, where access is often limited to only one side of a panel.

SUMMARY OF THE INVENTION

The present invention is directed to a temporary clamp that is useful for temporarily attaching a drill jig to an aircraft panel assembly. As will be described, the clamp utilizes an existing temporary fastener that positions the multiple layers of the panel assembly in preparation for fastening. Briefly, a drill jig or other tool can be attached to the panel assembly with the clamp. Holes are then formed in the panel assembly using the drill jig as a template. Rivets or other fasteners are inserted in the panel assembly holes before the temporary fasteners are removed. In one preferred form, the clamp comprises an elongated annular nut with external and internal threads. The internal threads attach to a draw bar of a temporary fastener and the external threads attach to a clamp socket. The clamp socket is an elongated annular portion with internal threads that are sized to mate with the external nut threads. When assembled, the clamp socket can be rotated relative to the nut to axially translate the clamp socket. This axial movement is used to impart a clamping force on a tool to secure the tool to the panel assembly that is attached to the temporary fastener. In another preferred form, the clamp attaches to the temporary fastener to allow for clearance for a thicker drill jig. In yet another preferred form, the clamp can be installed after the temporary fastener is installed on a work piece.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is an enlarged view of a portion of FIG. 1 illustrating the clamp of the present invention and the tool in greater detail;

FIG. 5 is a partial sectional side view of the outer shaft of the temporary fastener of FIG. 3;

FIG. 6 is a sectional plan view taken along the line 6—6 of FIG. 5;

DETAILED DESCRIPTION OF THE PREFERRED EMBODIMENTS

Figure 1:
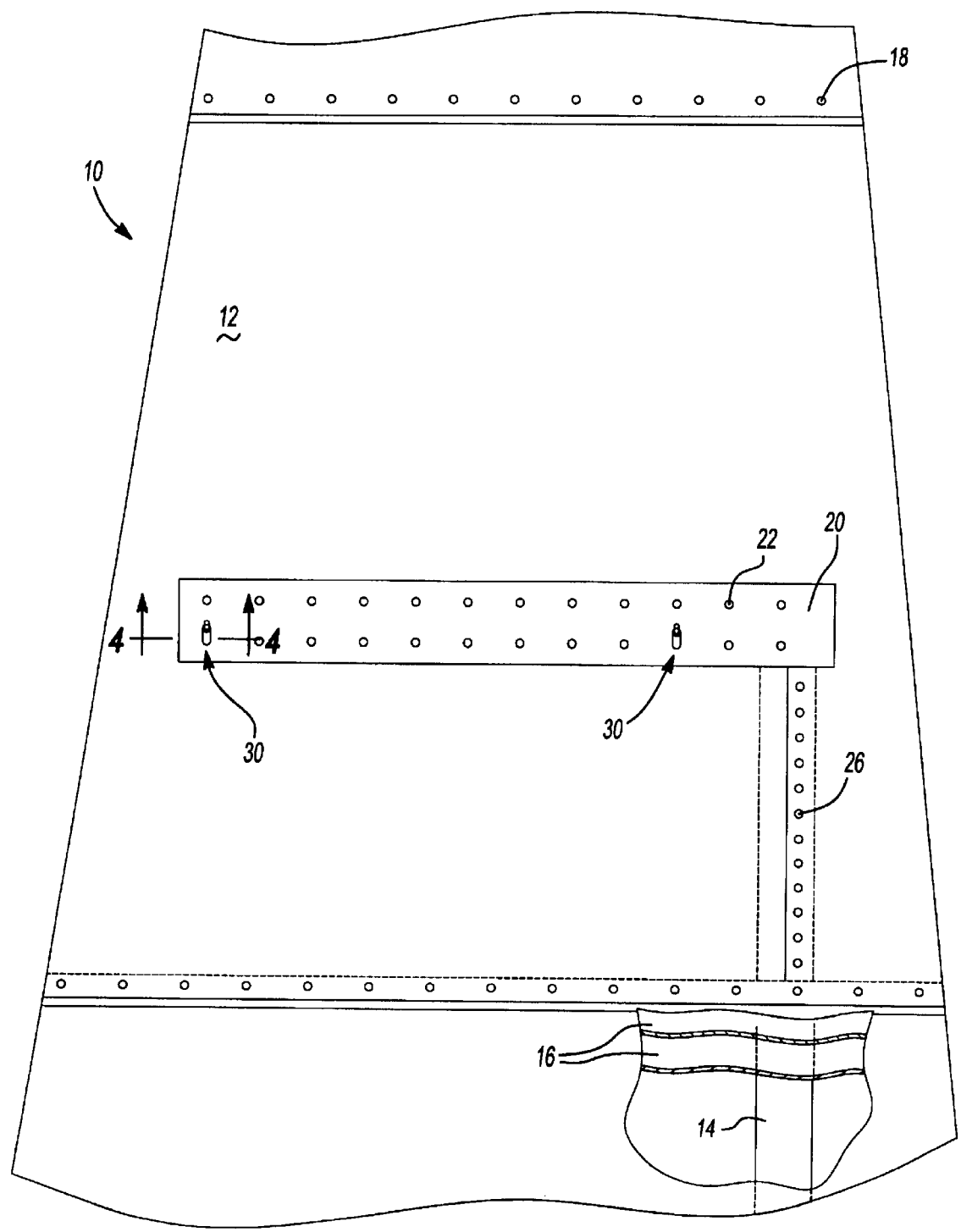
FIG. 1 is a partially broken away perspective view illustrating a clamp constructed in accordance with the teachings of the present invention, the clamp being shown locating and clamping an exemplary tool to an exemplary part.

With reference to FIG. 1, a portion of an aircraft wing is generally identified by reference numeral 10. Wing 10 includes a panel assembly 12 and structural members 14 (only one of which is visible). Panel assembly 12 generally includes multiple layers of panels 16. Panels 16 and structural members 14 are held together by a plurality of fasteners 18. A drill jig 20 is used to ensure the correct placement of fasteners 18. Briefly, drill jig 20 has various apertures 22 provided to align a drill (not shown) when forming a series of panel apertures 26. Generally, drill jig 20 is constructed for each specific application or location on the outer portions of an aircraft. Drill jig 20 is essentially a plate of steel or similar material with the apertures 22 formed at locations that correspond to the desired locations for the fasteners 18 that are used to assemble the panels 16 to one another and/or to the structural members 14. A clamp 30 in accordance with a preferred embodiment of the present invention is used to secure drill jig 20 to panel assembly 12 as discussed below.

Figure 3:
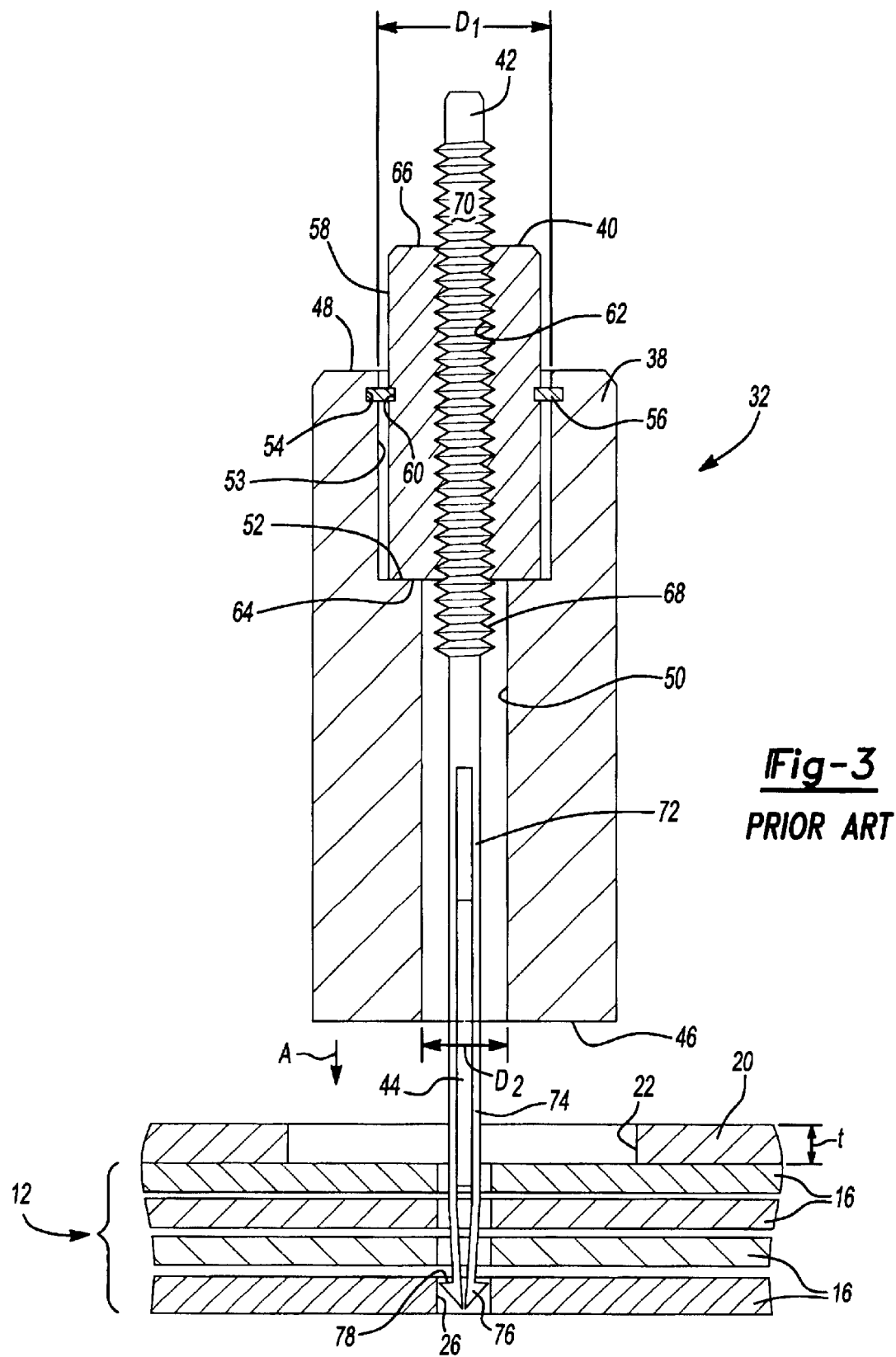
FIG. 3 is a sectional front view similar to that of FIG. 4; but illustrating only the temporary fastener as it is being inserted through the tool and parts.

Referring now to FIG. 2, the clamp 30 is shown in greater detail. Clamp 30 includes a temporary fastener 32 which is hidden therein when the clamp 30 is secured to the panel assembly 12, a sleeve member 34 and a socket 36. Temporary fastener 32 may comprise a CLECO™ fastener available from Monogram Aerospace Fasteners of Los Angeles, Calif. Referring to FIG. 3, temporary fastener 32 is shown in greater detail. Temporary fastener 32 includes an outer shaft 38, a spindle 40, a draw bar 42, and a wedge 44. Outer shaft 38 is a generally annular member that includes a lower end surface 46 that is generally parallel to an upper end surface 48, a bore 50 and an inner shoulder 52 formed as part of a recess 53. Bore 50 extends axially through the body of outer shaft 38 opening onto both the lower end surface 46 and the shoulder 52. Recess 53 has a diameter $D_1$ at upper end surface 48 that is larger than a diameter $D_2$ of the bore 50. Also preferably, outer shaft 38 includes an annular recess or groove 54 near upper end surface 48 and within the recess 53. A snap ring 56 can be inserted into annular recess 54, as will be discussed further below.

Spindle 40 is an annular member having an external surface 58 with a groove 60 formed therein. A threaded bore 62 is formed axially through the spindle 40. The spindle 40 has a thrust end surface 64 that is parallel a torque end portion 66. Draw bar 42 has threads 68 formed on a first portion 70 and a pair of tine-like elements at a second portion 74 defining two prongs 76. Draw bar 42 is threadably engaged within the threaded bore 62 of spindle 40. The torque end portion 66 of spindle 40 protrudes from upper end 48 of the outer shaft 38. Spindle 40 is inserted into bore 50 so that thrust end surface 64 abuts inner shoulder 52 within the recess 53. Snap ring 56 can then be inserted into annular recess 54 and groove 60. Thus provided, spindle 40 and outer shaft 38 are coupled for rotation therebetween while snap ring 56 and the interference between thrust end surface 64 and inner shoulder 52 resists axial translation between spindle 40 and outer shaft 38.

Figure 4:
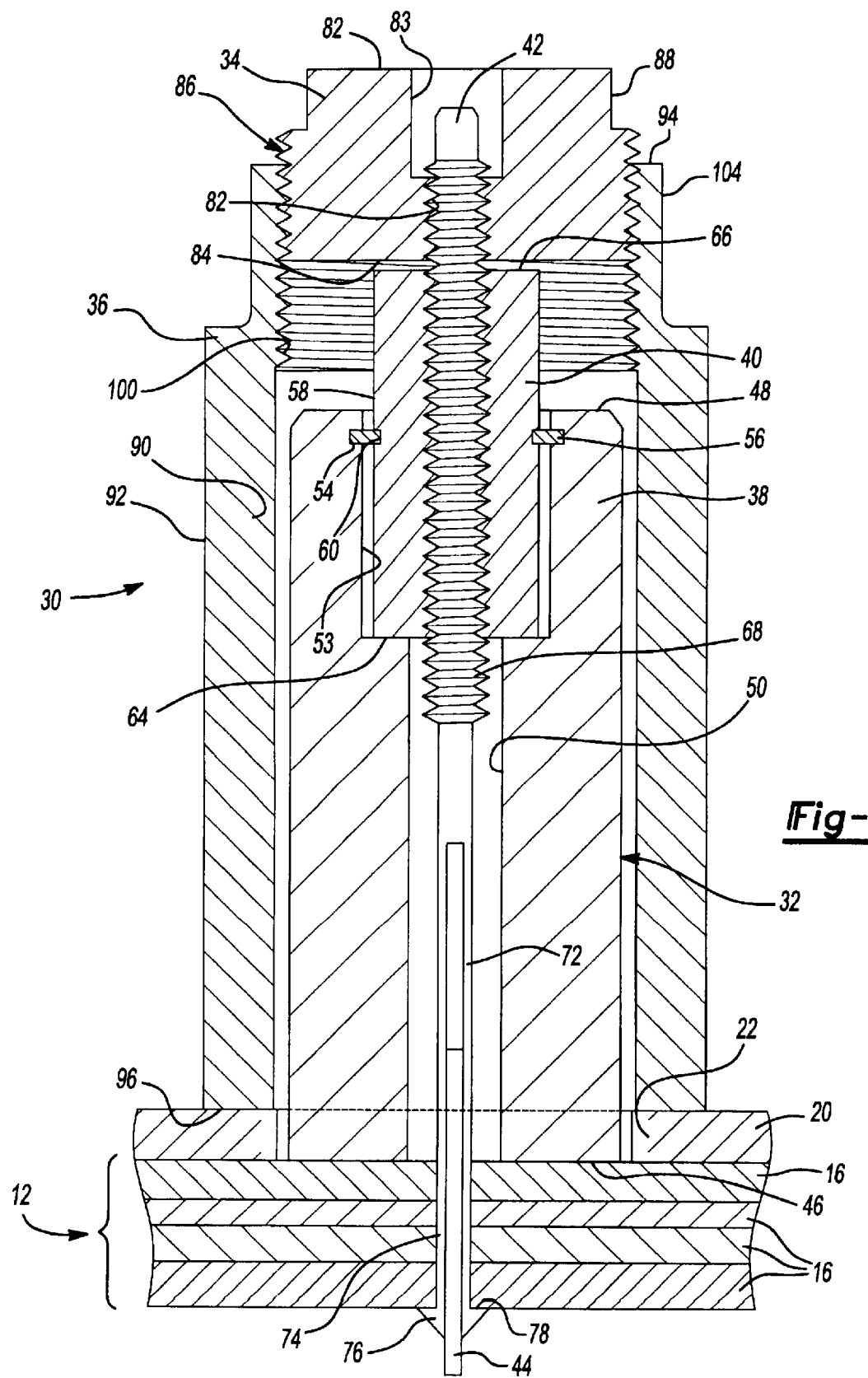
FIG. 4 is a sectional front view taken along the line 4—4 of FIG. 1.
Figure 7:
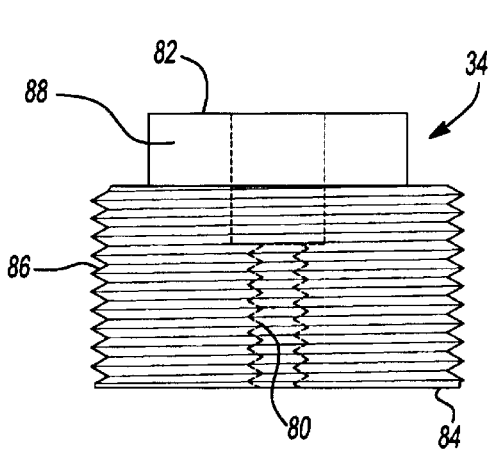
FIG. 7 is a front view of a portion of the clamp of FIG. 1 illustrating the sleeve member in greater detail.
Figure 8:
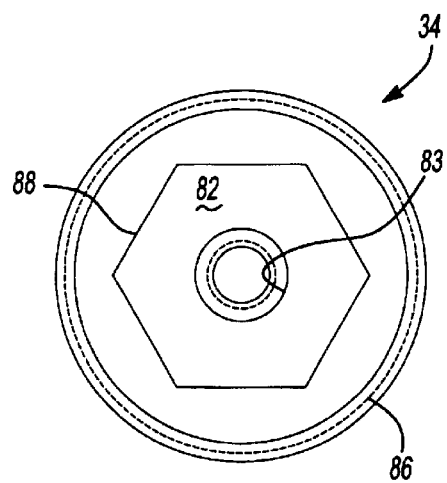
FIG. 8 is a plan view of the sleeve member of FIG. 7.

With specific reference to FIGS. 4, 5, and 6, wedge 44 is formed to extend from outer shaft 38 so as to prevent rotation of draw bar 42. In operation, rotation of spindle 40 causes axial translation of draw bar 42 relative to outer shaft 38.

As best seen in FIG. 3, spindle 40 can be rotated in a first direction so as to cause the second portion 74 of draw bar 42 to move outwardly from outer shaft 38 in the direction of arrow A and beyond wedge 44. In this position, the two prongs 76 of second portion 74 move inwardly toward one another due to their geometry and the characteristics of the material (preferably steel) from which the draw bar 42 is made (i.e., the prongs 76 are resiliently biased toward one another).

In order to attach temporary fastener 32 to panel assembly 12, the second portion 74 of draw bar 42 is inserted in panel aperture 26. When the second portion 74 is fully inserted in panel aperture 26, prongs 76 extend beyond panel assembly 12. Spindle 40 can be rotated in a second direction opposite to the first direction to cause axial translation of draw bar 42 in a direction opposite to that of arrow A, wherein prongs 76 move toward outer shaft 38 and panel assembly 12. While moving toward outer shaft 38, prongs 76 are forced apart due to the interference with wedge 44. When prongs 76 contact panel 16 (FIG. 4), a gripping portion 78 of each prong 76 contacts the surface of panel 16 that surrounds panel aperture 26, thus binding panels 16 together with temporary fastener 32. As spindle 40 is rotated further in the second direction, panels 16 of panel assembly 12 are tightly clamped between the prongs 76 and the outer shaft 38, thus securing fastener 32 to the panel assembly 12. While FIG. 3 illustrates that temporary fastener 32 can be installed within panel aperture 26 after drill jig 20 is positioned adjacent panel assembly 12, one of ordinary skill in the art will recognize that temporary fastener 32 can be installed within panel aperture 26 before drill jig 20 is positioned adjacent panel assembly 12.

With specific reference to FIGS. 4, and 7–10, clamp 30 further includes the sleeve member 34 and the socket 36. Sleeve member 34 is preferably an annular portion with a concentric internal threaded bore 80, a top end 82, a recess 83, a bottom end 84, a threaded outer surface 86 that intersects bottom end 84, and an outer torque surface 88 that intersects the top end 82.

Figure 9:
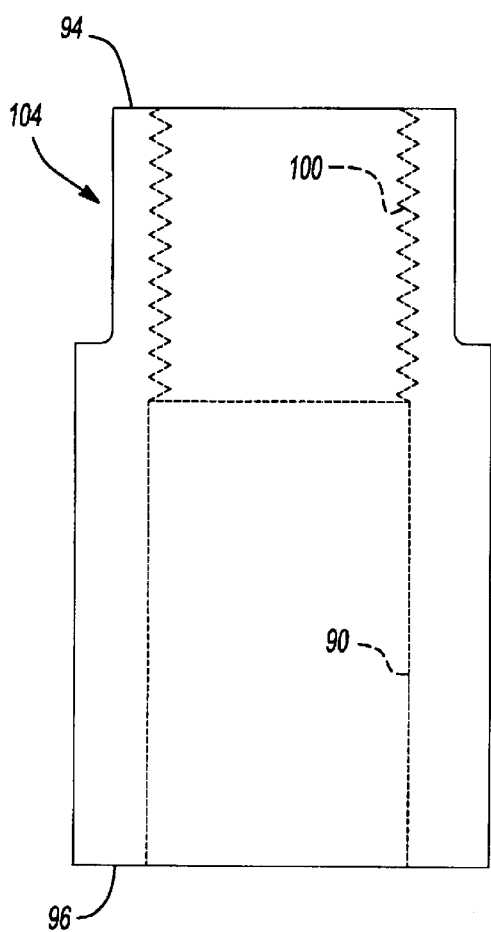
FIG. 9 is a front view of a portion of the clamp of FIG. 1 illustrating the socket in greater detail.
Figure 10:
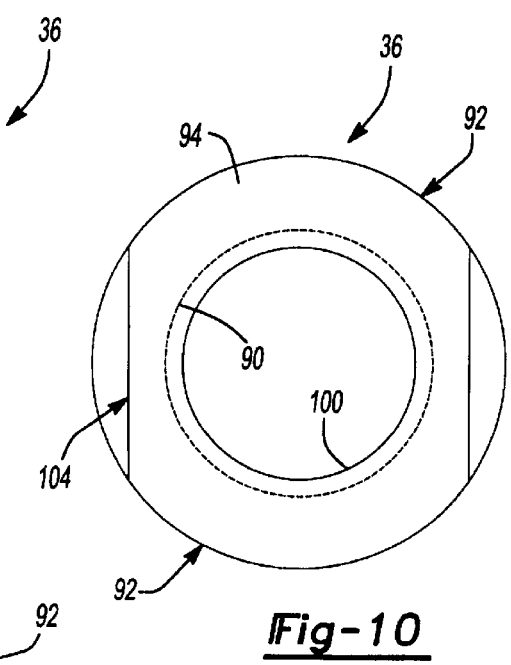
FIG. 10 is a plan view of the socket of FIG. 9.

With reference to FIGS. 4, 9, and 10, socket 36 is preferably an elongated annular portion that includes an inner surface 90, an outer surface 92, an adjustment end 94, and a clamping end 96. Inner surface 90 opens into a threaded bore 100 which in turn opens onto adjustment end 94. The threads of bore 100 couple with threaded outer surface 86 so as to allow sleeve member 34 and socket 36 of clamp 30 to releasably couple while allowing for axial adjustment therebetween. Preferably, outer surface 92 is provided with flat portions 104 to allow socket 36 to be rotated with a tool (not shown) such as an open end wrench. In operation, sleeve member 34 can be held at torque surface 88 with a hand or a tool while socket 36 is rotated. In this manner, socket 36 can be axially adjusted relative to sleeve member 34, temporary fastener 32, and panel assembly 12.

Turning now to the operation of clamp 30, temporary fastener 32 is installed onto panel assembly 12 as described herein. Preferably, a plurality of temporary fasteners 32 are installed in an arrangement that aligns with the arrangement of apertures 22 within drill jig 20. Drill jig 20 is then positioned adjacent panel assembly 12 with each temporary fastener 32 extending through one aperture 22. A plurality of the clamps 30 are then installed, one at a time, onto the draw bar 42 of each temporary fastener 32 with each clamp 30, internal threaded surface 80 of sleeve member 34 threaded onto its associated draw bar 42 preferably at least three full thread engagements. Threaded bore 100 of socket 36 is then threaded onto threaded outer surface 86 of sleeve member 34 until clamping end 96 contacts drill jig 20. Socket 36 can then be further rotated until clamping end 96 applies a sufficient amount of pressure on drill jig 20 to prevent relative movement between drill jig 20 and panel assembly 12. In this manner, clamp 30 is adjustable to accommodate drill jigs with different thicknesses "t" (as indicated in FIG. 3) and modification of temporary fastener 32 is not necessary. After drill jig 20 is properly oriented with respect to panel assembly 12, additional panel apertures 26 can be drilled using apertures 22 to ensure proper orientation. Additional clamps 30, fasteners 18 or temporary fasteners 32 can be installed in panel apertures 26 as desired. When all the required panel apertures 26 have been drilled, drill jig 20 can be removed by removing the sockets 36 of clamps 30. Temporary fasteners 32 can be removed and replaced with fasteners 18 to complete the assembly of panel assembly 12.

The clamp 30 thus forms a means for quickly and easily operating in connection with a conventional fastener to enable a tool jig to be securely clamped to a panel assembly in a quick and easy manner.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A clamp for releasably securing a plurality of members together in a subassembly, as well for securing a tool to the subassembly, the clamp comprising:

a temporary fastener having a threaded portion and a gripping portion, for clamping said plurality of members together into said subassembly; and a sleeve device for securing the tool to the subassembly, said sleeve device including:

a sleeve member for adjustably threadably engaging said threaded portion of said temporary fastener; and a socket member engaged with said sleeve member and axially adjustable relative to a spindle member for abutting a surface of said tool and clamping said tool to said surface of said subassembly.

2. The clamp of claim 1, wherein said socket member includes a threaded bore in threaded engagement with an outer surface of said sleeve member.

3. The clamp of claim 1, wherein said sleeve member includes a portion adapted to be grasped with at a tool to facilitate holding said spindle member stationary while said socket member is adjusted into clamping engagement with said tool.

4. A clamp for releasably securing a plurality of layered members together to form a first structure, and to thereafter releasably secure the first structure to a second structure, the clamp comprising:

a temporary fastener having:
an outer shaft having an axially extending bore formed therethrough, the outer shaft being configured to contact a proximal side of the first structure;
a draw bar having a gripping portion and an engagement portion, the draw bar being axially movable in the bore and configured to extend from the bore in the outer shaft and through an aperture formed through the first structure such that the gripping portion is movable into and out of contact with a distal side of the first structure; and
a spindle having a first clamping end, a first coupling end and a spindle aperture formed through the first clamping end and the first coupling end, the first clamping end abutting a portion of the outer shaft, at least a portion of the spindle aperture matingly engaging the engagement portion of the draw bar to permit the gripping portion to be adjusted relative to the distal surface of the first structure to thereby clamp the temporary fastener to the first structure; and
a sleeve device having a second clamping end, a second coupling end and a sleeve aperture formed through the second coupling end, the second clamping end being configured to abut a proximal side of the second structure, the second coupling end being matingly but releasably engaged to the engagement portion of the draw bar to permit the second clamping end to be axially adjusted relative to the gripping portion of the draw bar to thereby clamp the distal side of the second structure to the proximal side of the first structure.

5. The clamp of claim 4, wherein the engagement portion is threaded.

6. The clamp of claim 4, wherein the sleeve device includes an annular sleeve member and a socket that adjustably engages the sleeve member.

7. The clamp of claim 6, wherein the socket includes a threaded surface that threadably engages the sleeve member.

8. The clamp of claim 7, wherein each of the socket and the sleeve member include a plurality of wrench flats.

9. The clamp of claim 4, wherein the draw bar includes a plurality of flexible prongs that are movable between a first condition, which permits the gripping portion of the draw bar to be inserted through the aperture in the first structure, and a second condition, which permits the gripping portion to engage the distal side of the first structure.

10. The clamp of claim 9, further comprising a wedge formed to the outer shaft and interposed between the prongs, wherein the wedge cooperates with the prongs to radially translate the prongs as the prongs move between the first condition and the second condition.

11. The clamp of claim 4, further comprising coupling means for coupling the spindle and the outer shaft to one another in a manner that permits relative rotation therebetween but which substantially inhibits relative axial movement therebetween.

12. The clamp of claim 11, wherein the coupling means includes a snap ring.

13. The clamp of claim 4, wherein the engagement portion of the draw bar terminates at a tool engaging end.

14. A clamp for releasably securing a tool with an aperture to a workpiece comprising:

a temporary fastener including:
an outer shaft having an axial bore formed therethrough, the outer shaft being configured to contact a proximal side of the workpiece; and
a draw bar having a gripping portion and an engagement portion, the draw bar being axially movable in the bore and configured to extend from the bore in the outer shaft and through an aperture formed through the workpiece such that the gripping portion is movable into and out of contact with a distal side of the workpiece; and
a sleeve device including:
an annular sleeve member having a top end surface, a bottom end surface, an external threaded surface, a torque surface, and an internal threaded surface, wherein the internal threaded surface intersects the top end surface and is adapted to couple with the engagement portion, the torque surface intersects the top end surface, and the bottom end surface intersects both the internal threaded surface and the external threaded surface; and
a generally annular socket having internal threads, an adjustment end, and a clamping end, wherein the internal threads are configured to mate with the external threaded surface to allow the clamping end to clamp the tool to the workpiece, the outer diameter of the socket being greater than the diameter of the tool aperture, the clamping end configured to engage the tool, and the socket configured to be superposed about the outer shaft.

15. A method for attaching a tool to a workpiece having at least two components, the method comprising:

securing a temporary fastener to the workpiece wherein the temporary fastener includes an axially moveable draw bar disposed therethrough;
locating a tool adjacent the temporary fastener;
coupling a sleeve device to the draw bar of the temporary fastener, wherein the sleeve device secures the tool to the workpiece, and the step of coupling the sleeve device to the draw bar is performed after the step of securing the temporary fastener to the workpiece.

16. The method of claim 15, wherein the sleeve device is threadably engaged with the drawbar.

17. The method of claim 15, wherein the step of attaching the sleeve device further comprises:

attaching a socket to the sleeve member, wherein the socket clamps the tool to the workpiece.

18. The method of claim 15, wherein the step of coupling the sleeve device further comprises locating the sleeve device directly over the temporary fastener.

* * * * *